(12) United States Patent
Weisenstein et al.

(10) Patent No.: US 11,404,747 B1
(45) Date of Patent: Aug. 2, 2022

(54) CERIA COATINGS AND STRUCTURES FOR ZINC-BASED BATTERY SEPARATORS

(71) Applicant: ZAF ENERGY SYSTEMS, INCORPORATED, Bozeman, MT (US)

(72) Inventors: Adam Weisenstein, Bozeman, MT (US); Allen Charkey, Winter Haven, FL (US); Melissa D. McIntyre, Butte, MT (US)

(73) Assignee: ZAF ENERGY SYSTEMS, INCORPORATED, Bozeman, MT (US)

(*) Notice: Subject to any disclaimer, the term of this patent is extended or adjusted under 35 U.S.C. 154(b) by 0 days.

(21) Appl. No.: 17/675,523

(22) Filed: Feb. 18, 2022

(51) Int. Cl.
*H01M 50/446* (2021.01)
*H01M 50/429* (2021.01)
*H01M 50/434* (2021.01)
*H01M 50/451* (2021.01)

(52) U.S. Cl.
CPC ..... *H01M 50/446* (2021.01); *H01M 50/4295* (2021.01); *H01M 50/434* (2021.01); *H01M 50/451* (2021.01)

(58) Field of Classification Search
CPC .......................... H01M 50/446; H01M 50/451
See application file for complete search history.

(56) References Cited

U.S. PATENT DOCUMENTS

| | | | |
|---|---|---|---|
| 6,790,554 B2 | 9/2004 | May et al. | |
| 9,931,462 B2 | 4/2018 | Heller et al. | |
| 10,505,171 B2 | 12/2019 | Nishiura et al. | |
| 10,673,046 B2 | 6/2020 | Dadheech et al. | |
| 2008/0014506 A1 | 1/2008 | Sugiyama et al. | |
| 2009/0023028 A1 | 1/2009 | Sekine | |
| 2011/0223475 A1 | 9/2011 | Porob et al. | |
| 2015/0364790 A1* | 12/2015 | Yonehara | H01G 11/62 429/316 |
| 2017/0338537 A1 | 11/2017 | Nishiura et al. | |
| 2018/0190993 A1 | 7/2018 | Nishiura et al. | |
| 2019/0376193 A1 | 12/2019 | Liu | |

* cited by examiner

*Primary Examiner* — Stephan J Essex
(74) *Attorney, Agent, or Firm* — Brooks Kushman P.C.

(57) ABSTRACT

A zinc-based battery includes a non-sintered separator system including a polymer separator and a coating on the polymer separator. The coating includes cellulose acetate that prevents metallic zinc penetration into the separator, and ceria bound with the cellulose acetate that chemically oxidizes metallic zinc to zinc oxide.

7 Claims, 2 Drawing Sheets

CERIA COATINGS AND STRUCTURES FOR ZINC-BASED BATTERY SEPARATORS

TECHNICAL FIELD

This disclosure relates to separators and batteries containing the same.

BACKGROUND

A secondary cell may include an electrolyte, separator, negative electrode, and positive electrode.

Chemical reactions of a secondary cell are reversible. When the cell is being charged for example, the negative electrode may become positive and the positive electrode may become negative. When the cell is being discharged, it behaves like a primary cell.

SUMMARY

An electrochemical component has a ceria coating on or impregnated into a microporous polymer or cellulose-based substrate. Specifically, aqueous-based zinc batteries, such as lithium-zinc, nickel-zinc, silver-zinc, zinc-manganese dioxide, zinc-air, and zinc-ion, with ceria coated separators, along with zinc-ferrocyanide, zinc-chloride, and other halogen-based zinc flow-type batteries with these separators will exhibit extended cycle life. Microporous ceria separators can also be comprised of a fibrillated polytetrafluoroethylene skeletal network which is then coated or impregnated with a cellulosic-type layer forming a semipermeable membrane.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A challenge of zinc-based battery systems is the selection of a long-life separator that is chemically compatible with the electrolyte and can properly inhibit zinc dendrites from reaching the positive electrode and shorting the battery. Typical zinc-based battery separators are composed of microporous polymers or regenerated cellulose. These separators are chemically compatible with most aqueous electrolytes and will slow down zinc growth and migration. Eventually, however, zinc growth and migration into and through the typically used separators will lead to short cycle life in the zinc-based battery.

The addition of a cellulose acetate, ceria, and surfactant coating to the base separator material will stop metallic zinc growth through the separator by decreasing porosity and increasing tortuosity, and chemically oxidizing zinc to zinc oxide, thereby, eliminating further propagation of the zinc dendrite. This coating will allow for long life zinc-based batteries, without adding significant cost, impedance, or mass and volume.

The coating may be applied to the separator as a slurry using a solvent in combination with the cellulose acetate, ceria, and surfactant. The solvent maybe an organic, such as methyl ethyl ketone or acetone. The surfactant maybe an anionic surfactant, cationic surfactant, nonionic surfactant, zwitterionic/amphoteric surfactant, or combinations thereof. Coating methods include but are not limited to the following: dip coating, slot die coating, film spreading, screen printing, micro or standard gravure coating, spray coating, and web coating. Coating can be applied to both sides of the separator or a single side. If applied to a single side, this side should face the zinc electrode in the electrode stack construction.

Figure 1:
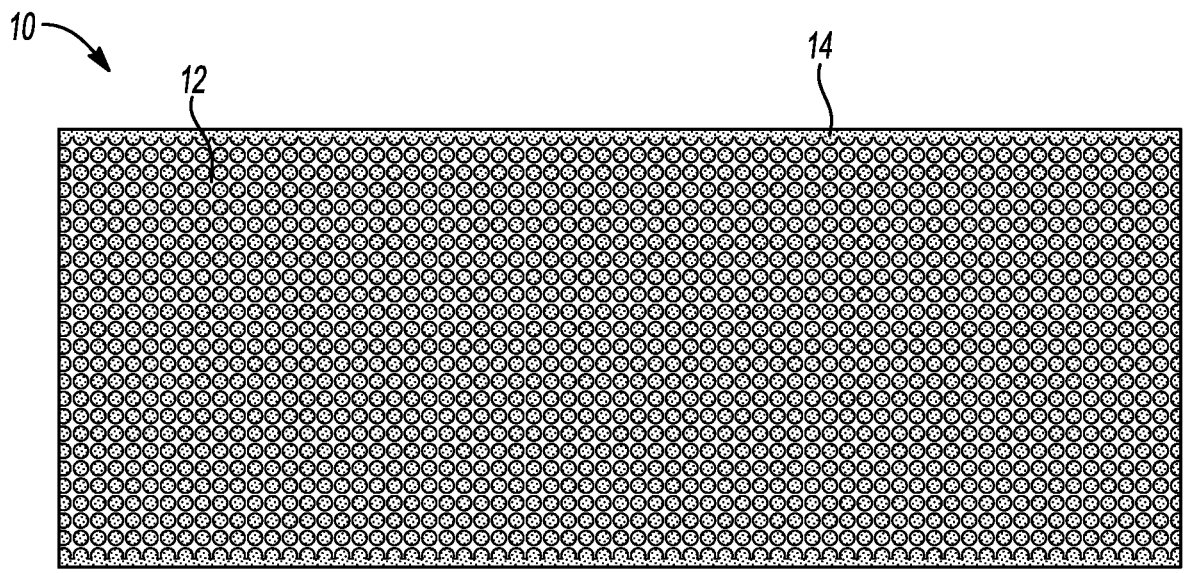
FIG. 1 is a schematic view of a coating including ceria, cellulose acetate, and surfactant on and in a microporous separator.

Referring to FIG. 1, a non-sintered separator system 10 includes a polymer separator 12 (e.g., microporous film, regenerated cellulose) and a coating 14 thereon. In this example, the coating 14 also occupies pores of the polymer separator 12, although in other examples it need not be so arranged. The coating 14 includes cellulose acetate 16, ceria 18, and a surfactant 20. The cellulose acetate prevents metallic zinc from penetrating the polymer separator 12. The ceria 18 is bound with the cellulose acetate 16 and chemically oxidizes metallic zinc to zinc oxide in a reversible process. The surfactant permits the coating 14 to penetrate the polymer separator 12 and the cellulose acetate 16 to fill the pores to decrease the porosity and increase the tortuosity of the separator system 10.

Figure 2:
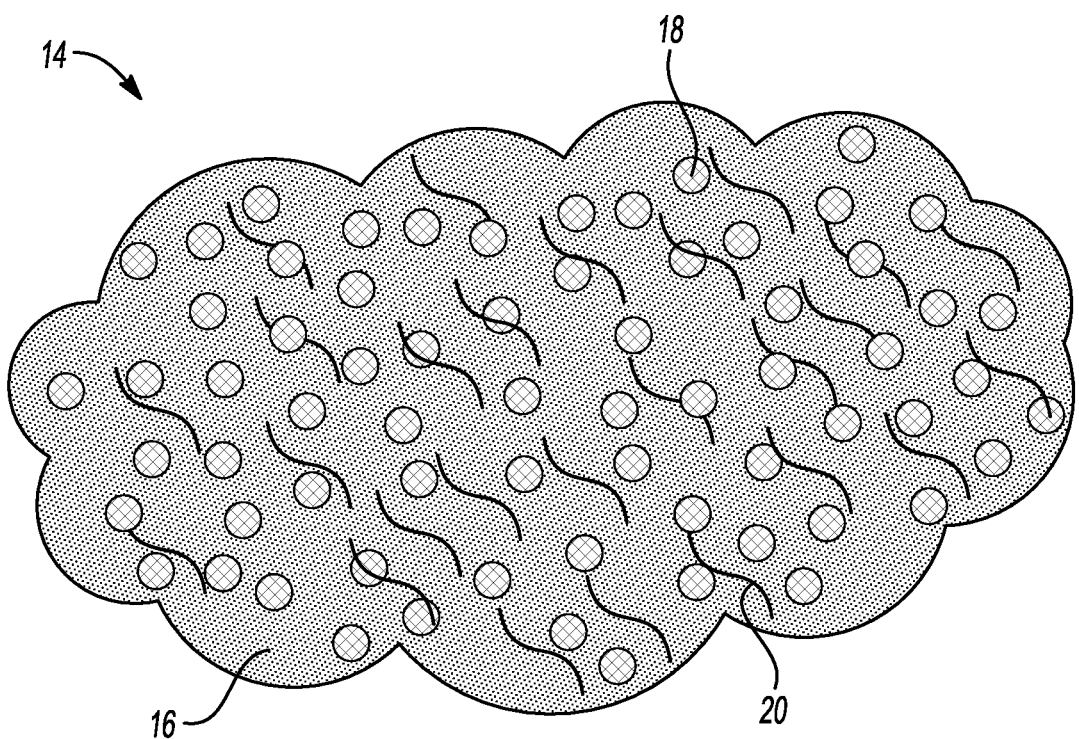
FIG. 2 is a schematic view of the separator coating including ceria, cellulose acetate, and surfactant.

Referring to FIG. 2, the coating 14 includes a generally evenly distributed mixture of the cellulose acetate 16, ceria 18, and surfactant 20. A ratio of the ceria to cellulose acetate is in a range of 1:3 to 1:7 (e.g., 1:5). The ceria 18 is generally less than 10% by mass of the coating 14 (e.g., 5%).

Figure 3:
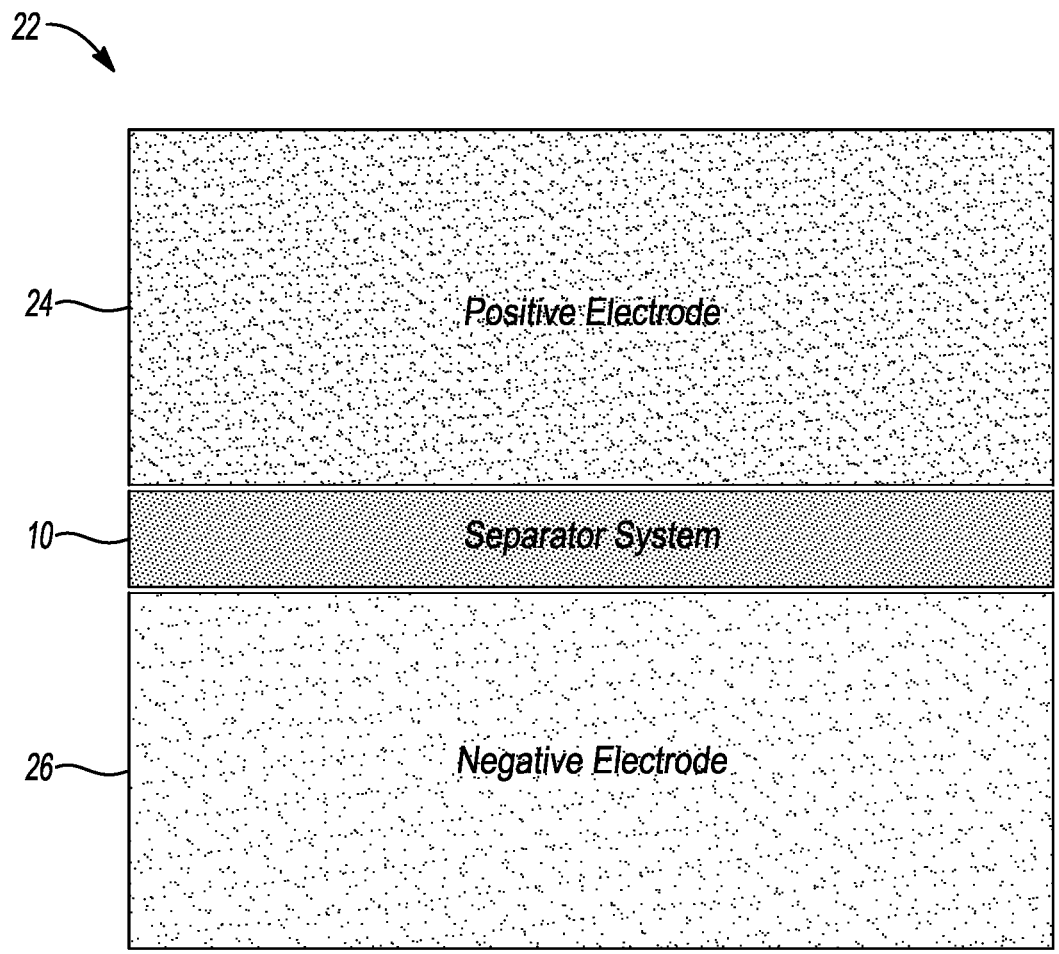
FIG. 3 is a schematic view of a battery.

Referring to FIG. 3, a zinc-based battery 22 includes a positive electrode 24, a negative electrode 26, and the separator system 10 disposed therebetween.

While exemplary embodiments are described above, it is not intended that these embodiments describe all possible forms encompassed by the claims. The words used in the specification are words of description rather than limitation, and it is understood that various changes may be made without departing from the spirit and scope of the disclosure.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A zinc-based battery comprising:
a non-sintered separator system including a polymer separator and a coating on the polymer separator and occupying pores dispersed throughout a body of the polymer separator such that the polymer separator is impregnated with the coating, wherein the coating includes (i) cellulose acetate configured to prevent metallic zinc penetration into the separator, (ii) ceria bound with the cellulose acetate and configured to chemically oxidize metallic zinc in contact therewith to zinc oxide, and (iii) a surfactant.

2. The zinc-based battery of claim 1, wherein a ratio of ceria to cellulose acetate is in a range of 1:3 to 1:7.

3. The zinc-based battery of claim 2, wherein the ratio is 1:5.

4. The zinc-based battery of claim 1, wherein the separator is a microporous film.

5. The zinc-based battery of claim 1, wherein the separator is regenerated cellulose.

6. The zinc-based battery of claim 1, wherein the ceria is less than 10% by mass of the coating.

7. The zinc-based battery of claim 6, wherein the ceria is 5% by mass of the coating.

* * * * *